United States Patent
Thomas et al.

(10) Patent No.: US 10,611,669 B2
(45) Date of Patent: Apr. 7, 2020

(54) THERMAL ENERGY CONTROL SYSTEM FOR AN OPTICAL FIBER

(71) Applicant: Corning Incorporated, Corning, NY (US)

(72) Inventors: John Christopher Thomas, Elmira, NY (US); Kevin Lee Wasson, Elmira, NY (US)

(73) Assignee: Corning Incorporated, Corning, NY (US)

( * ) Notice: Subject to any disclaimer, the term of this patent is extended or adjusted under 35 U.S.C. 154(b) by 439 days.

(21) Appl. No.: 15/405,645

(22) Filed: Jan. 13, 2017

(65) Prior Publication Data

US 2017/0217821 A1 Aug. 3, 2017

Related U.S. Application Data

(60) Provisional application No. 62/288,570, filed on Jan. 29, 2016.

(51) Int. Cl.
*C03B 37/025* (2006.01)
*C03B 37/027* (2006.01)
*C03B 37/07* (2006.01)
*G02B 6/02* (2006.01)

(52) U.S. Cl.
CPC .... *C03B 37/0253* (2013.01); *C03B 37/02727* (2013.01); *C03B 37/07* (2013.01); *G02B 6/02395* (2013.01); *C03B 2205/42* (2013.01); *C03B 2205/55* (2013.01); *C03B 2205/56* (2013.01); *Y02P 40/57* (2015.11)

(58) Field of Classification Search
None
See application file for complete search history.

(56) References Cited

U.S. PATENT DOCUMENTS

| 4,437,870 | A | | 3/1984 | Miller |
| 4,529,262 | A | | 7/1985 | Ashkin |
| 4,894,078 | A | * | 1/1990 | Takimoto .......... C03B 37/02718 65/432 |
| 5,314,515 | A | * | 5/1994 | Cain ................. C03B 37/02718 65/434 |

(Continued)

FOREIGN PATENT DOCUMENTS

| CA | 1214058 A1 | 11/1986 |
| CA | 2306305 A1 | 10/2000 |

(Continued)

OTHER PUBLICATIONS

JPS623037A English Translation Performed by McElroy Translations Nov. 2010. (Year: 2010).*

(Continued)

*Primary Examiner* — Lisa L Herring
(74) *Attorney, Agent, or Firm* — Robert L. Carlson (57) ABSTRACT

A method of controlling the temperature of an optical fiber is provided that includes the steps of: providing an energy transfer member configured to accept or provide thermal energy, the energy transfer member defines an energy transfer surface; passing an optical fiber proximate the energy transfer member such that a gap is defined between the optical fiber and the energy transfer surface; and transferring thermal energy between the optical fiber and the energy transfer member via conduction across the gap.

10 Claims, 8 Drawing Sheets

(56) References Cited

U.S. PATENT DOCUMENTS

| | | | |
|---|---|---|---|
| 6,078,714 A | 6/2000 | Cavanaugh | |
| 6,485,190 B1 | 11/2002 | Zheng | |
| 6,546,758 B1 | 4/2003 | Schuepbach | |
| 6,715,323 B1 | 4/2004 | Roba et al. | |
| 7,937,971 B2 | 5/2011 | Costello, III | |
| 8,655,123 B2 | 2/2014 | Donlagic | |
| 8,973,409 B2 | 3/2015 | Gregorski | |
| 9,322,601 B2 | 4/2016 | Corso | |
| 2002/0134530 A1* | 9/2002 | Giacobbe | C03B 37/01446 165/58 |
| 2003/0101774 A1* | 6/2003 | Oh | C03B 37/02718 65/488 |
| 2003/0205066 A1 | 11/2003 | Ghani et al. | |
| 2005/0144986 A1* | 7/2005 | Bookbinder | C03B 37/01211 65/412 |
| 2006/0219605 A1* | 10/2006 | Devitt | B65G 49/065 209/37 |
| 2009/0166032 A1 | 7/2009 | Carr, Sr. | |
| 2010/0281922 A1* | 11/2010 | Costello, III | C03B 37/02718 65/430 |
| 2011/0085767 A1 | 4/2011 | Miao | |
| 2011/0117231 A1 | 5/2011 | Klockow | |
| 2013/0129947 A1* | 5/2013 | Harvey | C03B 33/091 428/34.4 |
| 2013/0255323 A1* | 10/2013 | Matsushita | G02B 6/02395 65/435 |
| 2015/0218031 A1* | 8/2015 | Otosaka | C03B 23/045 65/29.19 |
| 2016/0031739 A1* | 2/2016 | Lezzi | C03B 27/0404 65/32.1 |

FOREIGN PATENT DOCUMENTS

| | | |
|---|---|---|
| CA | 2720017 A1 | 5/2011 |
| DE | 3919953 A1 | 12/1990 |
| EP | 2498110 A2 | 9/2012 |
| EP | 2324994 B1 | 1/2015 |
| JP | 62003037 A | 1/1987 |
| JP | 2000335943 A | 12/2000 |
| JP | 2004338972 A | 12/2004 |

OTHER PUBLICATIONS

Alexiades et al., "The New Way/Glaston Problem", 28th Annual Workshop on Mathematical Problems in Industry, Univ. of Delaware, Jun. 2012, 30 slides. (Year: 2012).*

International Search Report and Written Opinion PCT/US2017/015001 dated Aug. 8, 2017; 19 Pages; European Patent Office.

International Search Report and Written Opinion PCT/US2017/015001 dated May 2, 2017.

* cited by examiner

THERMAL ENERGY CONTROL SYSTEM FOR AN OPTICAL FIBER

This application claims the benefit of priority under 35 U.S.C. § 119 of U.S. Provisional Application Ser. No. 62/288,570 filed on Jan. 29, 2016 the content of which is relied upon and incorporated herein by reference in its entirety.

BACKGROUND

The present invention generally relates to methods and apparatus for forming optical fibers and, more particularly, relates to optical fiber thermal control methods incorporating non-contact fiber centering and cooling.

Conventional manufacturing processes for producing optical fibers typically include drawing an optical fiber from an optical fiber preform in a draw furnace, cooling the drawn fiber, and coating the fiber after it is sufficiently cooled. The optical fiber is typically drawn in a furnace at about 2,000° C. and the heat is typically transported to the preform mostly by radiation and removed from the drawn fiber during the cooling stage.

SUMMARY

According to one embodiment, a method of controlling the temperature of an optical fiber is provided that includes the steps of: providing an energy transfer member configured to accept or provide thermal energy, the energy transfer member defines an energy transfer surface; passing an optical fiber proximate the energy transfer member such that a gap is defined between the optical fiber and the energy transfer surface; and transferring thermal energy between the optical fiber and the energy transfer member via conduction across the gap.

According to a further embodiment, a method of making an optical fiber is provided that includes steps of: providing at least two bearing members, each of the bearing members defining an bearing surface, wherein the at least two bearing members define a fiber aperture; and passing an optical fiber through the fiber aperture proximate the bearing surfaces such that a bearing gap is defined. The bearing surfaces mirror the shape of the optical fiber and surround about 90° or more of the circumference of the optical fiber. The fiber aperture may also be configured to change a direction of the fiber. For example, in some embodiments the fiber direction of travel may be changed by greater than about 90° or more.

According to yet another embodiment, a thermal control device is provided that includes at least two energy transfer members. Each of the energy transfer members defines an energy transfer surface and an elongate member positioned proximate the energy transfer surfaces, such that a gap is defined. The energy transfer surfaces mirror the elongate member. The elongate member and the energy transfer members are thermally coupled via conduction across the gap.

According to yet another embodiment, a method of controlling the temperature of an elongate member is provided which includes the steps of providing an energy transfer member defining an energy transfer surface, passing an elongate member proximate the energy transfer member such that a bearing gap is defined between the elongate member and the energy transfer surface, passing a gas through the porous energy transfer member into the bearing gap, and transferring thermal energy between the elongate member and the energy transfer member via conduction across the gap.

According to yet another embodiment, a system for an optical fiber is provided that includes at least two energy transfer members defining a gas supply cavity and an inlet gap therebetween. Each of the energy transfer members defines an energy transfer surface and an optical fiber positioned proximate the energy transfer members such that a bearing gap is defined. The inlet gap extends in a longitudinal direction with respect to an axis of the optical fiber.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Reference will now be made in detail to the present embodiments, examples of which are illustrated in the accompanying drawings. Whenever possible, the same reference numerals will be used throughout the drawings to refer to the same or like parts.

Figure 1:
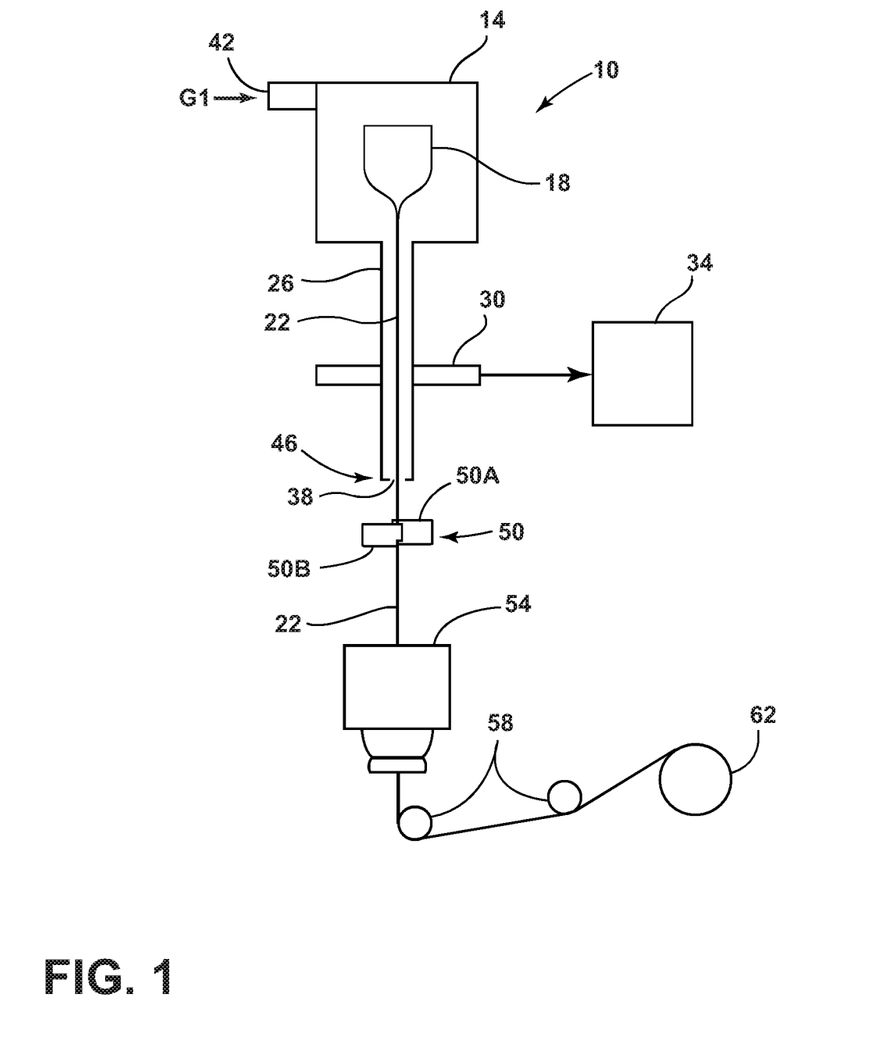
FIG. 1 is a schematic diagram illustrating an optical fiber production system employing a fiber thermal control device, according to one embodiment.

For purposes of description herein, the terms "upper," "lower," "right," "left," "rear," "front," "vertical," "horizontal," and derivatives thereof, shall relate to the disclosure as oriented in FIG. 1, unless stated otherwise. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting unless the claims expressly state otherwise. Additionally, embodiments depicted in the figures may not be to scale or may incorporate features of more than one embodiment.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

An optical fiber production system 10 and method produces optical fibers through use of a furnace and fiber centering and thermal control device. Embodiments of the optical fiber production system 10 and method are herein described in connection with FIGS. 1-6, wherein like numbers indicate the same or corresponding elements throughout the drawings. The phrase "bare optical fiber," as used herein, means an optical fiber 22 directly drawn from a preform and prior to applying a protective coating layer to its outer surface (e.g., prior to the bare optical fiber 22 being coated with a polymeric based primary and secondary coating material). The optical fiber production system 10 and method allows for the formation of an optical fiber 22 with reduced defects using effective fiber temperature adjustment techniques as disclosed herein.

Referring to FIG. 1, the optical fiber production system 10 is generally shown, according to one embodiment. The system 10 includes a furnace 14 that may be heated to a temperature of about 2,000° C. A glass optical fiber preform 18 is placed in the furnace 14 and fiber is drawn therefrom to create the bare optical fiber 22. The preform 18 may be constructed of any glass or material, and may be doped, suitable for the manufacture of optical fibers. Once the bare optical fiber 22 is drawn from the preform 18, the bare optical fiber 22 may be cooled in a slow-cooling treatment device 26 shown and described herein as a treatment tube according to one embodiment. The fiber 22 may have a diameter of between about 60 μm and about 250 μm, or between about 100 μm and about 150 μm. In a specific example, the fiber 22 may have a diameter of about 125 μm. The slow-cooling tube or treatment device 26 is shown integrally coupled to an exit of the furnace 14, according to one embodiment. However, it should be appreciated that the treatment device 26 could otherwise be distanced from the furnace 14 or otherwise connected thereto according to other embodiments.

As used herein, the term "treatment device" refers to any device downstream from the draw furnace 14 in which the bare optical fiber 22 is cooled at a rate that is slower than the cooling rate of the fiber 22 in air at 25° C. and a pressure of 1 atm, and may include a tube as shown and described herein. The treatment device 26 may be connected to the output of the furnace 14 so that it enters the treatment device 26 at a temperature between, for example, about 2,100° C. and 1,600° C. and cools the optical fiber 22 at a rate that is slower than the cooling rate of the fiber 22 in air at 25° C. and a pressure of 1 atm. The fiber 22 exits the treatment device 26 at a temperature which may be greater than 500° C. The fiber 22 may be treated in the treatment device 26 for a time which is sufficient to result in a decrease in attenuation compared to a fiber of identical design which is not treated in the treatment device. The average cooling rate of the fiber in the treatment device 26 is defined as the fiber surface temperature at the entry point of the fiber 22 into the treatment device 26 (the fiber entry surface temperature) minus the fiber's surface temperature at an exit point of the fiber 22 out of the treatment device 26 (the fiber exit surface temperature) divided by the total residence time of the fiber 22 in the treatment device 26. The treatment device 26 may have a length in the range of about 1 to 10 meters, or in the range of about 2 to 8 meters. Having the treatment device 26 with a longer length may allow for the fiber 22 to be drawn at faster speeds and still achieve the residence time necessary to achieve desired attenuation reduction. For example, significant attenuation reduction can be achieved in such devices while drawing the fiber 22 at speeds greater than 20 meters/second, 25 meters/second and in some cases greater than 30 meters/second.

The treatment device 26 is depicted having one or more optional pressure reducing or vacuum ports 30 connected to a vacuum pump 34. The vacuum pump 34 is optional and if employed, can be used to create a reduced pressure or partial vacuum within the treatment device 26 and, in the example shown, also creates a reduced pressure or a partial vacuum within the furnace 14 which is connected thereto. However, it will be understood that use of a vacuum device is not necessary in conventional fiber manufacturing processes. A single vacuum pump 34 is coupled to a single vacuum port 30 in the embodiment shown. However, it will be understood that one or more vacuum ports and/or one or more vacuum pumps may be employed to achieve the desired reduced pressure in one or more chambers of the treatment device 26 and/or furnace 14. The treatment device 26 advantageously is configured to cool the bare optical fiber 22 in a controlled environment as it passes from the furnace 14 to an exit port 38.

In addition, a gas inlet 42 is shown for providing an inert gas, shown as G1, as an input to the furnace 14. The gas G1 may include argon, helium, other noble gasses, nitrogen, other gasses inert to the fiber 22 and preform 18, and combinations thereof, to reduce the amount of ambient air reaching the furnace 14. It will be understood that more than one gas inlet 42 may be employed at various locations of the furnace 14 and treatment device 26.

In the example shown in FIG. 1, the bare optical fiber 22 drawn from the preform 18 passes out through the bottom of the furnace 14, through the treatment device 26, out the exit port 38 at an outlet 46, and then passes through a fiber thermal control device 50. The fiber thermal control device 50 may be configured to alter the temperature of the fiber 22 by applying or extracting thermal energy to/from the fiber 22. In some examples, the fiber thermal control device 50 may also be configured to turn or change the direction of the fiber 22. After sufficient cooling, the bare optical fiber 22 is then subjected to a coating unit 54 where a primary protective coating layer is applied to the outer surface of the bare optical fiber 22. After leaving the coating unit 54, the optical fiber 22 with a protective layer can pass through a variety of processing stages within the production system 10, such as tractors or rollers 58 and onto fiber storage spool 62. One of the rollers 58 may be used to provide the necessary tension on the optical fiber 22 as it is drawn through the entire system and eventually wound onto the storage spool 62.

Figure 2A:
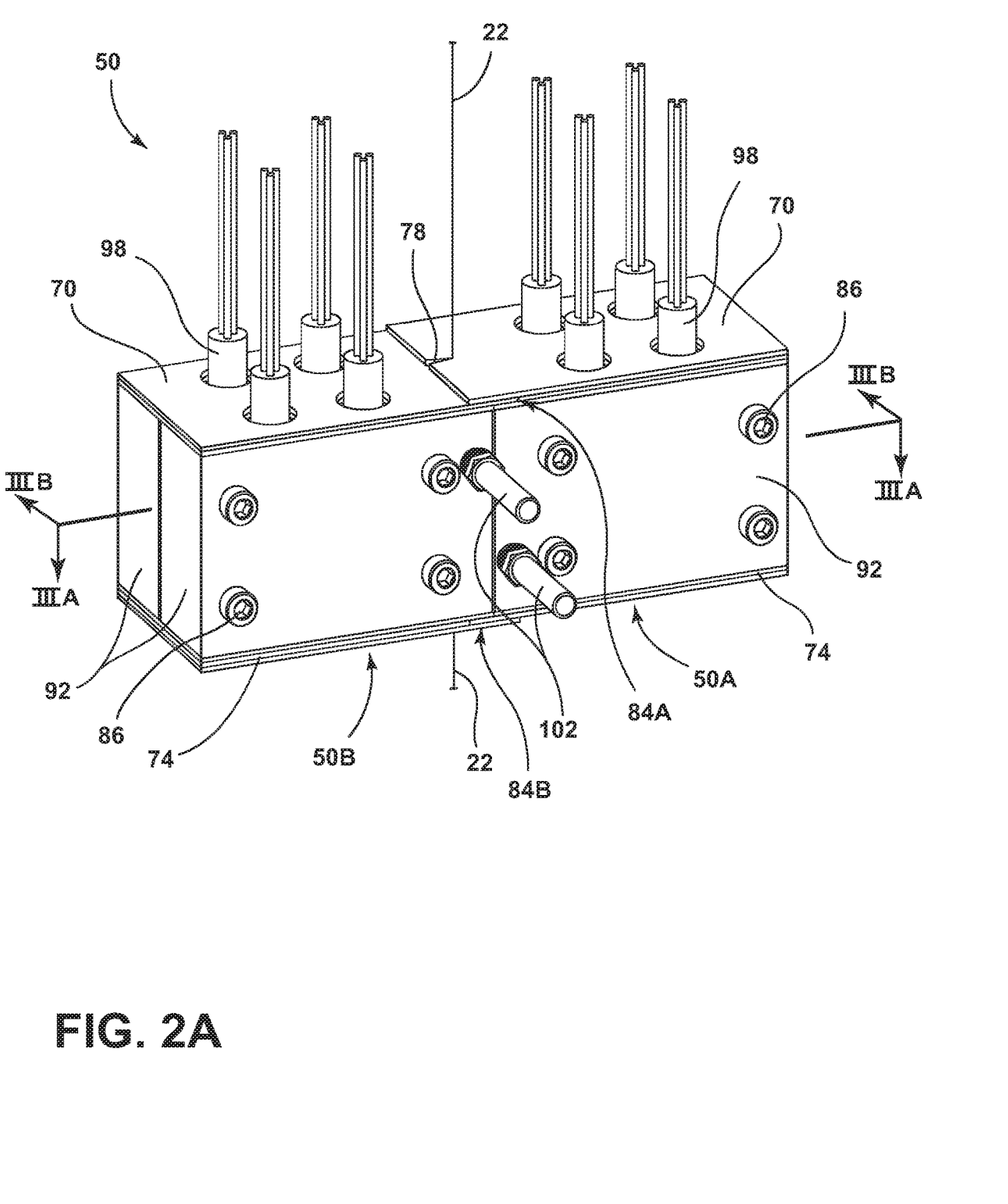
FIG. 2A depicts a top perspective view of a fiber thermal control device, according to one embodiment.
Figure 2B:
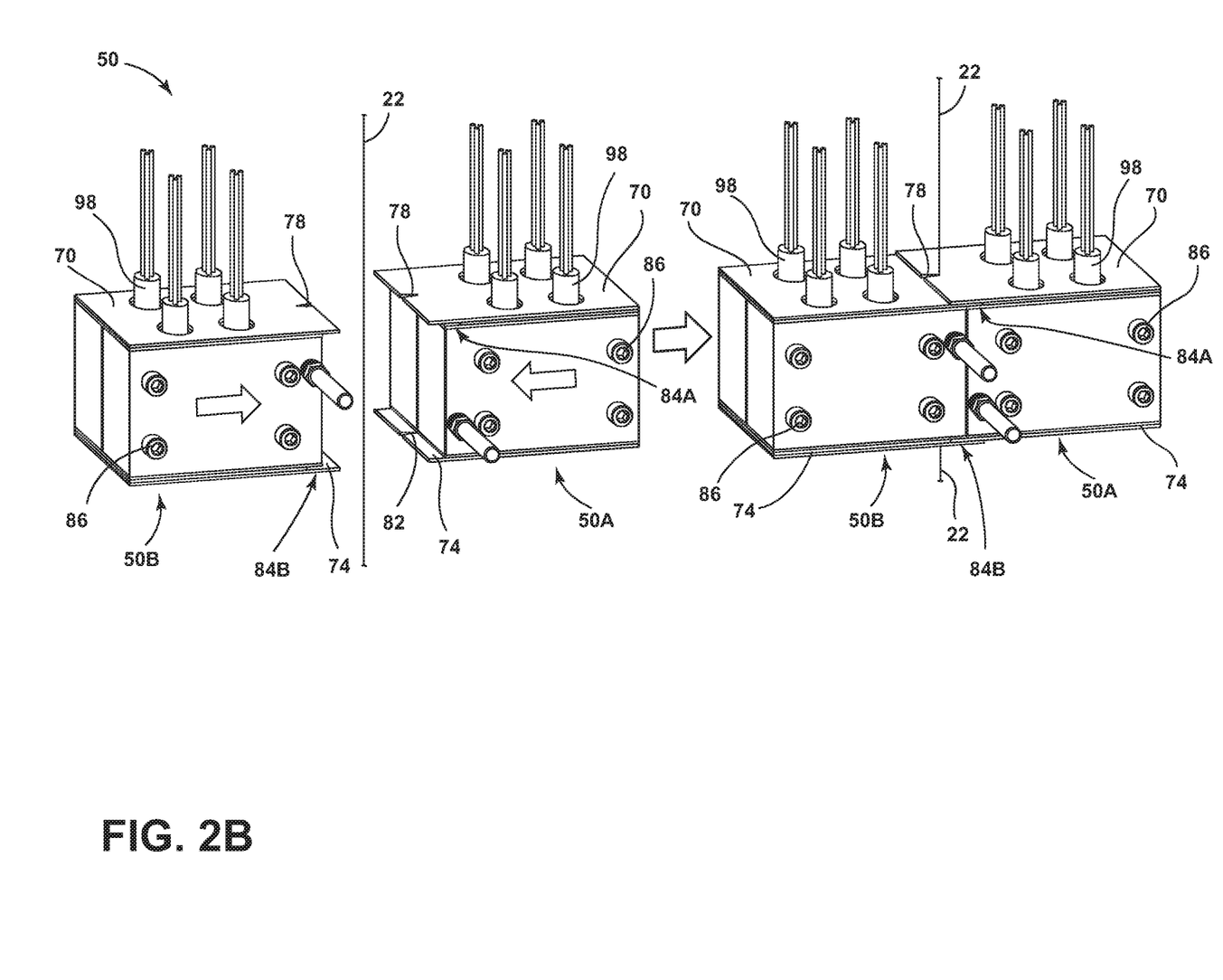
FIG. 2B depicts a top perspective view of the assembly of the fiber thermal control device of FIG. 2A in open and closed positions, according to one embodiment.
Figure 3A:
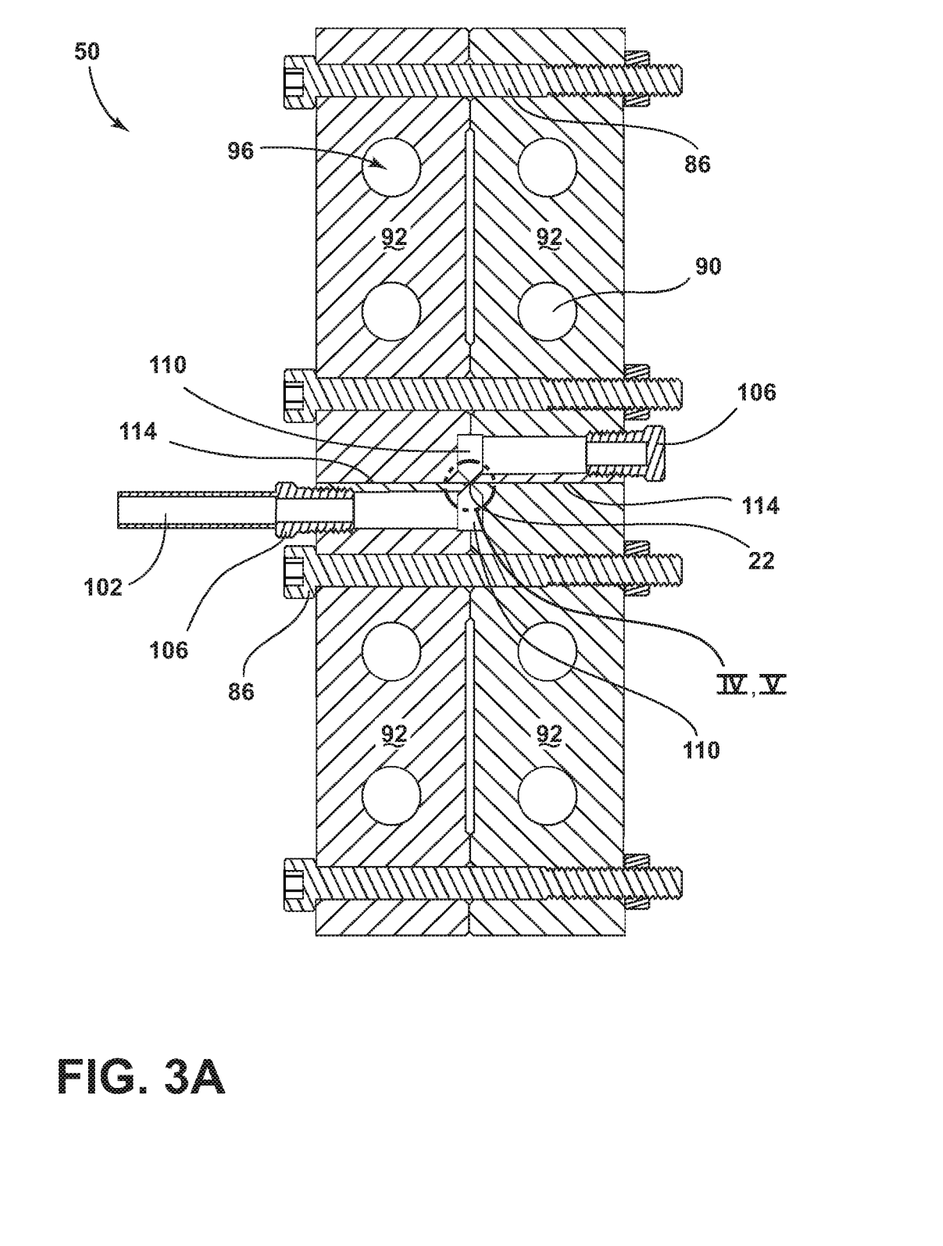
FIG. 3A depicts a cross-sectional view of the fiber thermal control device taken at line IIIA-IIIA of FIG. 2A, according to one embodiment.
Figure 3B:
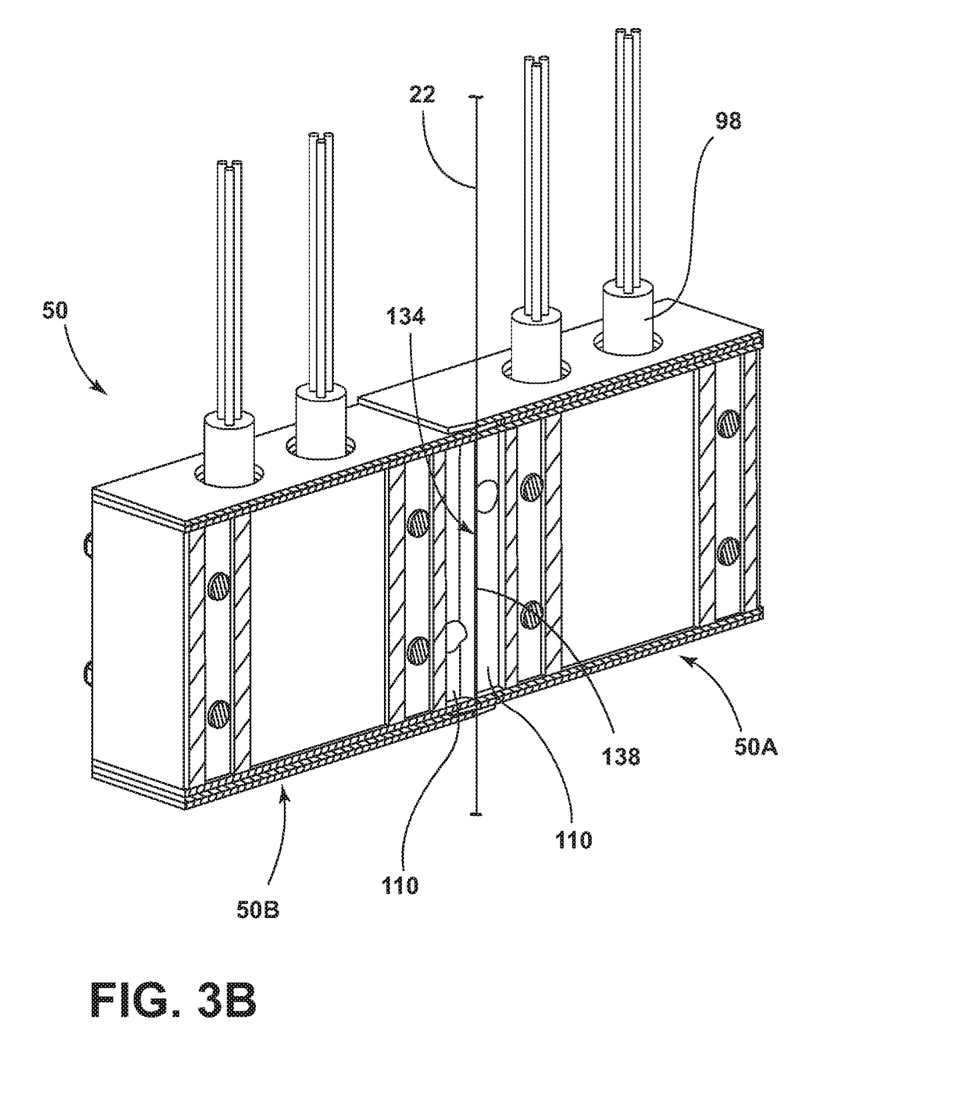
FIG. 3B depicts a depicts a cross-sectional view of the fiber thermal control device taken at line IIIB-IIIB of FIG. 2A, according to one embodiment.

Referring now to FIGS. 2A and 2B, the fiber thermal control device 50 may include a first assembly 50A and a second assembly 50B configured to be actuated together around the bare optical fiber 22. The first and second assemblies 50A, 50B may be actuated together using a high precision moving system (e.g., precision slides having ball screw actuators, ball bearing linear guides or air bearing slides). In a specific example, the first and second assemblies 50A, 50B may be on a carriage configured to move the assemblies relative to the fiber 22. Each of the first and second assemblies 50A, 50B includes a top fiber threading plate 70 and a bottom fiber threading plate 74. Each of the top fiber threading plates 70 defines a top fiber groove 78 and each of the bottom fiber threading plates 74 defines a bottom fiber groove 82. As the first and second assemblies 50A, 50B are actuated together, the optical fiber 22 is aligned and positioned within the top and bottom fiber grooves 78, 82. Each of the top fiber grooves 78 and each of the bottom fiber grooves 82 are sized to accept the insertion of the fiber 22 into the fiber thermal control device 50 without contacting the fiber 22. The first and second assemblies 50A, 50B are configured to mate together in an interlocking manner. In the depicted example, the top fiber threading plate 70 of the second assembly 50B is configured to engage a top notch 84A disposed on the first assembly 50A and the bottom fiber threading plate 74 is configured to engage a bottom notch 84B disposed on the second assembly 50B. Disposed through the first and second assemblies 50A, 50B are a plurality of clamping screws 86.

In various embodiments, the fiber thermal control device 50 is configured to alter the temperature of the fiber 22 as the fiber 22 passes through the device 50. As explained in greater detail below, the fiber thermal control device 50 may heat (i.e., apply thermal energy to the fiber 22), cool (i.e., remove thermal energy from the fiber 22) and/or maintain the temperature of (i.e. apply a net neutral amount of thermal energy to the fiber 22) the fiber 22. It will be understood that the rate of cooling or heating of the fiber 22 may also be controlled by the fiber thermal control device 50. By controlling the input or extraction of thermal energy from the fiber 22, the temperature of the fiber 22 can be varied between about 300K and about 1400K. Alteration of the speed of heating or cooling may increase or decrease optical attenuation of light within the fiber 22. It will be understood that the fiber 22 may be replaced with any elongate member (e.g., metal fiber, wire, sheet) such that energy transfer may be carried out on the elongate member.

In the depicted embodiment, each of the first and second assemblies 50A, 50B includes two energy transfer members 92 configured to absorb or emit thermal energy to the fiber 22 as it passes through the fiber thermal control device 50. The energy transfer members 92 may also be known as bearing members. Each of the first and second assemblies 50A, 50B may have one or more energy transfer members 92. The energy transfer members 92 are held together within the first and second assemblies 50A, 50B using the clamping screws 86. The energy transfer members 92 may be composed of a thermally conductive material such as iron, aluminum, copper, nickel, gold, silver, platinum, other metals, alloys thereof, composite materials, silicon carbine, ceramics, glasses, carbon allotropes, diamond and combinations thereof. It will be understood that a coating, film and/or cladding of a different material (e.g., any of the aforementioned materials) may be positioned on a base material of the energy transfer members 92. For example, the energy transfer members 92 may include a base member made of aluminum with a cladding (e.g., one of the surfaces) including nickel disposed over the base member.

The first and second assemblies 50A, 50B may each define a plurality of holes 96 (FIG. 3A) into which a plurality of cartridge heaters 98 are disposed. The cartridge heaters 98 may provide thermal energy to the fiber thermal control device 50 to alter the temperature of the fiber 22. When the fiber thermal control device 50 is operated to heat the fiber 22, the cartridge heaters 98 may be heated to above the temperature of the fiber 22 such that thermal energy flows into the fiber 22 through the energy transfer members 92 (e.g., the energy transfer members 92 and cartridge heaters 98 act as a heat source). When the fiber thermal control device 50 is operated to cool the fiber 22, the cartridge heaters 98 may be heated to any temperature below the temperature of the fiber 22 such that thermal energy flows from the fiber 22 and into the energy transfer members 92 where it is dissipated (e.g., the energy transfer members 92 act as a heat sink). It will be understood that by altering the thermal gradient between the energy transfer members 92 and the fiber 22, the rate of heating or cooling may be adjusted. In examples where the energy transfer members 92 are configured to act as a heat sink, the energy transfer members 92 may include one or more water jacket, water lines, air lines, coolant lines, heat fins or other structures configured to dissipate heat from the energy transfer members 92. In other examples, the cartridge heaters 98 of one of the assemblies (e.g., the first assembly 50A) may be set to heat the fiber 22 while the cartridge heaters 98 of the other assembly (e.g., the second assembly 50B) may be set to cool, thus creating a temperature gradient across the fiber 22 and fiber thermal control device 50. In such an example, the fiber 22 may be twisted as it moves through the fiber thermal control device 50 or may remain rotationally stable.

Referring now to FIGS. 2A-3B, each of the first and second assemblies 50A, 50B includes a gas inlet fitting 102 configured to allow gas flow into the fiber thermal control device 50. The gas inlet fitting 102 is configured to mate with a gas inlet plug 106. The plugs 106 allow gas to flow from the fitting 102, through the first and second assemblies 50A, 50B, and into gas supply cavities 110. The gas inlet fittings 102 are configured to allow gas to enter the fiber thermal control device 50 between about 0.1 bar and about 10 bar of pressure. The gas may be air, nitrogen, helium, noble gases, inert gases, gases inert to the fiber 22 and combinations thereof. Each of the first and second assemblies 50A, 50B defines a gas supply cavity 110. The gas supply cavities 110 extend in a generally vertical direction over a portion of the height of the first and second assemblies 50A, 50B. In the depicted example, the gas supply cavities 110 extend almost from the top fiber threading plate 70 to the bottom fiber threading plate 74 within each of the first and second assemblies 50A, 50B. In some examples, the gas supply cavities 110 may be different heights. Defined between the first and second assemblies 50A, 50B are gas exit cavities 114. The gas exit cavities 114 allow the gas to escape the fiber thermal control device 50. In some embodiments, a capture device may be placed around the fiber thermal control device 50 or at an end of the gas exit cavities 114 such that the gas may be captured, recycled and/or reused.

Figure 4:
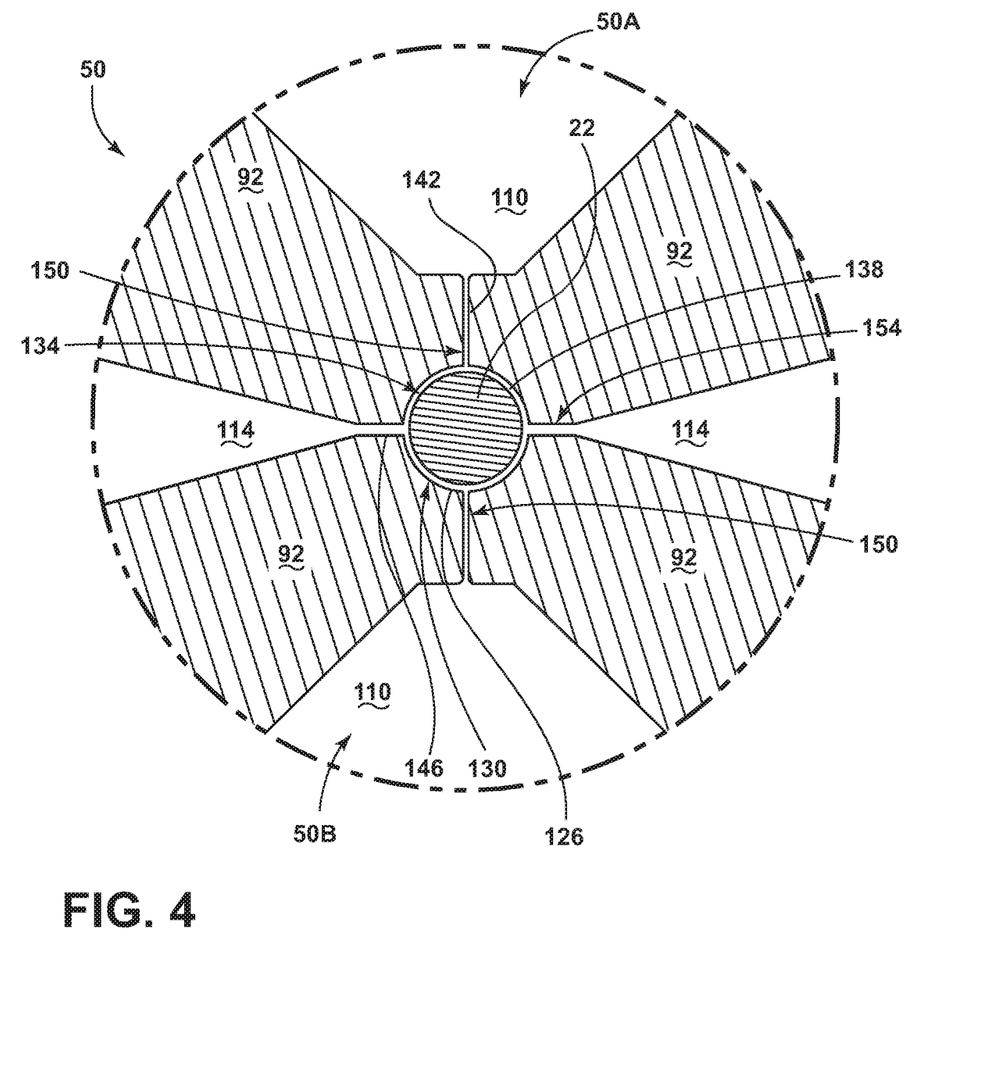
FIG. 4 depicts an enlargement of section IV of FIG. 3A.

Referring now to FIG. 4, the energy transfer members 92 are shaped to converge around the bare optical fiber 22. In the depicted embodiment, the energy transfer members 92 are positioned around a linear (e.g., straight) section of fiber 22, but may also be positioned around a curved portion of the fiber 22, as explained in greater detail below. Each of the energy transfer members 92 defines an energy transfer surface 126. In various embodiments, the energy transfer surfaces 126 may be curved such that each energy transfer surface 126 defines an aperture 130. In various embodiments, the energy transfer surfaces 126 may be shaped to mirror a surface of the fiber 22 (e.g., curved). For example, where the energy transfer surfaces 126 are mirroring a round optical fiber 22, the energy transfer surfaces 126 may have a similar curvature and shape to that of the fiber 22. In other embodiments, the energy transfer surfaces 126 may be flat, have ridges, and/or may be textured. Cooperation of the apertures 130 of the energy transfer members 92 creates a fiber aperture 134 through which the bare optical fiber 22 travels. The energy transfer members 92 may cooperate to surround greater than about 45°, 90°, 135°, 180°, 225°, 270° or 315° of the radial circumference of the fiber 22. In various embodiments, the energy transfer members 92 may substantially or fully surround the fiber 22. The fiber aperture 134 may take a similar shape to that of a cross-sectional shape of the fiber 22 (e.g., circular aperture 134 with a circular fiber 22), or it may be different (e.g., circular aperture 134 with a square fiber 22). The fiber aperture 134 is sized such that a bearing gap 138 is formed between a surface of the fiber 22 and the energy transfer surfaces 126. The bearing gap 138 may have a radial width between the fiber 22 and the energy transfer surfaces 126 of between about 0.5 µm and about 40 µm, more preferably between about 1 µm and about 30 µm, even more preferably between about 3 µm and about 10 µm and in some cases between about 4 µm and about 7 µm. In a specific example, the bearing gap 138 may have a radial width of about 5 µm. The radial width of the bearing gap 138 may vary around the perimeter of the fiber 22.

In addition to the energy transfer surface 126 and the aperture 130, each of the energy transfer members 92 define an inlet surface 142 and an outlet surface 146. The inlet surfaces 142, when the energy transfer members 92 are in assembly, are positioned in a spaced apart manner such that at least two inlet gaps 150 are formed which fluidly connect the gas supply cavities 110 with the bearing gap 138. It will be understood that the energy transfer members 92 may define more than two inlet gaps 150 (e.g., between 3-20 inlet gaps 150). In the depicted example, the inlet gaps 150 are constricted linear gaps, but the inlet gaps 150 may take a variety of constricted shapes. The inlet gaps 150 may have a width (i.e., the distance between the energy transfer members 92) of between about 0.5 µm and about 10 µm, or between about 3 µm to about 7 µm. In a specific example, the inlet gaps 150 may have a width of about 5 µm. The inlet gap 150 may have a length (e.g., distance between the gas supply cavity 110 and bearing gap 138) of between about 50 µm and about 200 µm, or between about 75 µm and about 125 µm. In a specific example, the inlet gap 150 has a length of about 100 µm. The inlet gaps 150 extend in a longitudinal direction with respect to an axis of the fiber 22. In other words, the inlet gaps 150 extend along the length of the fiber 22. The inlet gaps 150 may extend greater than about 0.1 mm, 0.2 mm, 0.5 mm, 1.0 mm, 2.0 mm, 5.0 mm, 10.0 mm, 100 mm, 500 mm or greater than about 1.0 m along the length of the fiber 22.

The outlet surfaces 146 are positioned in a spaced apart manner, similar to that of the inlet surfaces 142, such that one or more outlet gaps 154 are formed. The outlet gaps 154 may be wider than inlet gap 150, thus allowing the gas to easily be removed from the bearing gap 138. The inlet gaps 150 allow gas from the gas supply cavities 110 to enter the bearing gap 138. The gas is forced through the inlet gap 150 by the gas pressure. The constricted nature of the inlet gap 150 creates a pressure drop across the inlet gap 150 between the gas supply cavities 110 and the bearing gap 134. The pressure drop across the inlet gap 150 may be defined as the gas pressure at the fiber 22 divided by the gas supply pressure within the gas supply cavities 110 and converted to percent. The pressure drop may be between about 1% and about 99%, or between about 5% and about 95%, or between about 20% and about 80%, or between about 40% and about 60%. In specific examples, the pressure drop may be greater than about 20%, 30%, 40%, 50%, 60%, 70%, 80%, 90%, 95% or greater than about 99%. The gas may enter the bearing gap 134 at a flow rate of less than about 0.02 kg/s/m, 0.015 kg/s/m, 0.01 kg/s/m, 0.004 kg/s/m, 0.003 kg/s/m, 0.002 kg/s/m, 0.001 kg/s/m, 0.0005 kg/s/m, lower than about 0.0001 kg/s/m or lower than about $3 \times 10^{-6}$ kg/s/m. The gas may have a temperature between about 300K and about 1400K. As the gas enters the bearing gap 138, the gas separates and flows in two directions through the bearing gap 138 around the fiber 22. As the gas enters the bearing gap 138 and contacts the bare optical fiber 22, the gas forms a gas cushion which causes the fiber 22 to levitate in a stable manner, preventing the fiber 22 from contacting the energy transfer surfaces 126. Thus, while influencing the temperature of the fiber 22, the fiber thermal control device 50 may simultaneously function as a gas/air bearing and/or fiber centering device which guides the fiber 22 to approximately the center of the fiber aperture 134 without contacting members 92. The use of two inlet gaps 150 positioned on opposite sides of the fiber 22 allows for equal and opposite force to be applied to the fiber 22 such that the fiber 22 remains nested and centered within the fiber aperture 134. Additionally, the presence of the gas between the fiber 22 and the energy transfer members 92 allows for the exchange of thermal energy between the fiber 22 and the energy transfer members 92. As the gas moves around the fiber 22 it reaches the outlet gaps 154 and is transferred to the exit cavities 114. The gas is then allowed to exit the fiber thermal control device 50 between the first and second assemblies 50A, 50B. The gas may be released to the atmosphere or collected for subsequent processing, cleaning and reuse.

Use of the small radial width of the bearing gap 138 allows for thermal energy to be transferred between the energy transfer surface 126 and the bare optical fiber 22 such that the fiber 22 and the energy transfer members 92 are thermally coupled via conduction through the gas. For example, conduction may account for greater than about 1%, greater than about 2%, greater than about 5%, greater than about 10%, greater than about 25%, greater than about 30%, greater than about 40%, greater than about 50%, greater than about 60%, greater than about 70%, greater than about 80%, greater than about 90% or about 100% of energy transferred between the optical fiber 22 and the energy transfer members 92. Conduction is a process of heat transfer where energy is transmitted through interactions between adjacent molecules, and convection is a process of heat transfer where energy is communicated via motion of a fluid (e.g., gas, air, helium, liquids etc.), such as where heated fluid moves away from a heat source and is replaced by cooler fluid. Thus, the present system is markedly different from conventional convection-based fiber thermal control systems in which the primary mode of heat transfer during cooling of the fiber 22 is convective. In various embodiments, the primary mode of thermal energy transfer between the energy transfer members 92 and the fiber 22 may be conduction and not convection. In other embodiments, the primary mode of thermal energy transfer between the energy transfer members 92 and the fiber 22 may be convection with a portion of the energy transfer occurring via conduction.

According to various embodiments, without the constraints typically imposed by gas flow and gap size in a convective system, gas flow and the size of the bearing gap 138 can be selected, controlled or optimized for a variety of purposes, such as for controlling stiffness of the gas cushion in the bearing gap 138, for supporting the fiber 22, for optimizing heat conduction, and for maintaining fiber 22 stiffness and/or shape during thermal strengthening. To illustrate, $Q_{cond}$, the conductive component of the rate of heat transfer through the bearing gap 138 of width g (e.g., the radial width between the fiber 22 and the energy transfer surfaces 126) where the bearing gap 138 has an area $A_g$ (in a direction everywhere perpendicular to the direction of the gap width g) may be given by:

$$Q_{cond} = \frac{A_g k (T_S - T_{HS})}{g} \quad (1)$$

where k is the thermal conductivity of the material (gas) in the bearing gap 138 evaluated in the direction of (or opposite of) heat conduction, $T_S$ is the temperature of the surface of the fiber 22 and $T_{HS}$ is the temperature of the heat sink surface (e.g., the energy transfer surface 126) (or the heat source surface, for other examples). To evaluate k rigorously would require integrating the thermal conductivity of the gas along (or against) the direction of conductive heat flow, as the thermal conductivity of the gas varies with temperature, but as a good approximation, k may be taken as the value of k for the gas in the bearing gap 138 when at the average of the temperatures of the two surfaces, $T_S$ and $T_{HS}$.

Reframing equation (1) in units of heat transfer coefficient (units of heat flow power per meter squared per degree Kelvin) gives:

$$\frac{Q_{cond}}{A_g(T_S - T_{HS})} = \frac{k}{g} \quad (2)$$

so the effective heat transfer coefficient for conduction across the bearing gap 138 is the thermal conductivity of the medium in the gap 138 (e.g., the gas) (in units of W/mK) divided by the width of the bearing gap 138 (in meters), giving a value of Watts per meter squared per degree of temperature difference. With respect to the convective component of the heat transfer across the bearing gap 138, the convective component $Q_{conv}$ may be given by:

$$Q_{convec} = e \dot{m} C_p \left( \frac{T_s - T_{HS}}{2} - T_i \right) \quad (3)$$

where $\dot{m}$ is the mass flow rate of the gas, $C_p$ is the specific heat capacity of the gas, $T_i$ is the inlet temperature of the gas as it flows into the bearing gap 138 and e is the effectiveness of the heat exchange between the gas flowing in the gap 138 and the fiber surface and the energy transfer surfaces 126 of the energy transfer members 92. The values of e vary from 0 (representing zero surface-to-gas heat exchange) to 1 (representing the gas fully reaching the temperature of the surfaces). Accordingly, the conductive and convection portions of heat transferred across the bearing gap 138 may be adjusted based on the parameters of the thermal control device 50.

Figure 5:
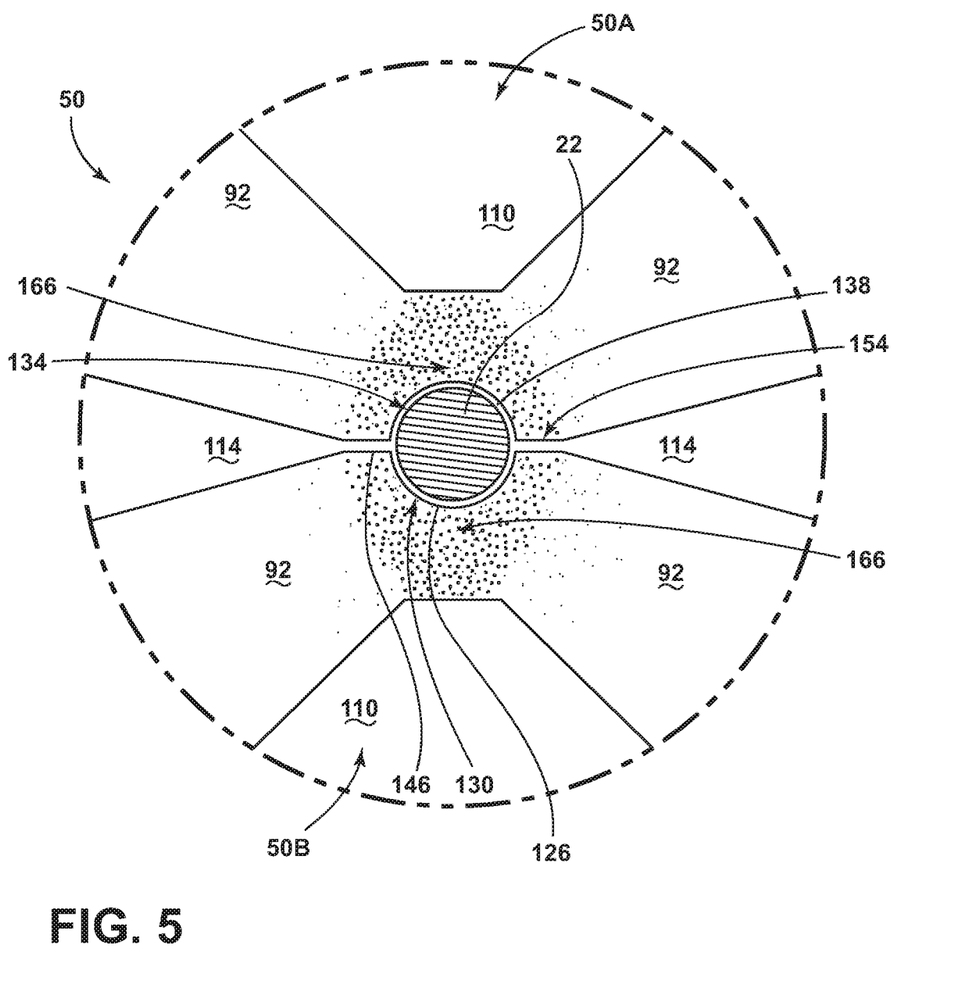
FIG. 5 depicts an enlargement of section V of FIG. 3A, according to one embodiment.

Referring now to FIG. 5, the inlet gaps 150 (FIG. 4) defined by the energy transfer members 92 may be replaced by one or more porous portions 166 having a plurality of pores. The porous portions 166 are configured to fluidly connect the gas supply cavities 110 with the bearing gap 138. The constricted nature of the porosity of the porous portions 166 is configured to allow the gas to enter the bearing gap 138, while decreasing the pressure of the gas similar to the inlet gaps 150. The thickness of the portions 166 may be chosen based on a desired pressure drop of the gas. The porous portions 166 may be composed of porous graphite, metal foams, mesoporous silica, porous metal oxides, porous metals and/or other porous materials. The porous portions 166 may be composed of a material that is microporous, mesoporous, or macroporous. The pores of the porous portions 166 may have an ordered or random orientation. In the depicted example, the outlet gaps 154 may still be present to allow gas within the bearing gap 138 to exit the fiber thermal control device 50. In other examples, the outlet gaps 154 may be replaced by other porous portions 166 configured to allow exit of the gas from the bearing gap 138. In examples where the outlet gaps 154 are replaced with porous portions 166, there may be a higher level of porosity through the outlet designated portions 166 as compared to the inlet designated porous portions 166.

Figure 6:
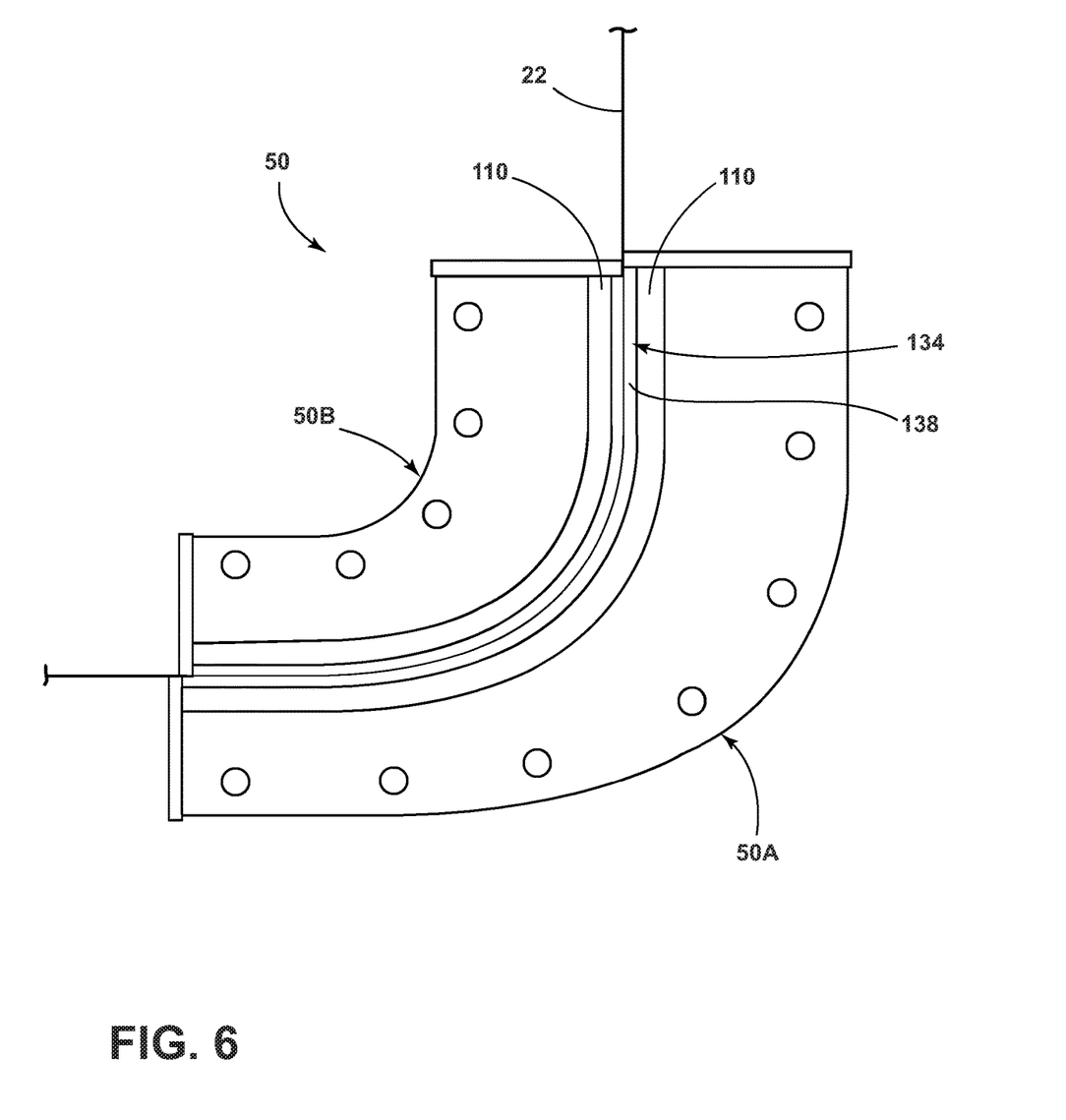
FIG. 6 depicts a cross-sectional view of the fiber thermal control device configured as a fiber turn device, according to an alternate embodiment.

Referring now to FIG. 6, the same structure used for the fiber thermal control device 50 may also be used as a gas bearing to change the direction of the fiber 22 such that the fiber bearing control device 50 may function as a fiber turn device. In the depicted example, the fiber bearing device 50 is configured to change the direction of the fiber 22 by about 90°, but it will be understood that the fiber bearing device 50 may change the direction of the fiber 22 between 1° and about 360° without physically contacting the fiber 22. The direction of the fiber 22 is altered by passing the fiber 22 through a curved example of the fiber aperture 134 between bearing surfaces 126. A curved fiber aperture 134 changes direction through the fiber bearing device 50. As the fiber 22 passes through the fiber aperture 134, the gas within the bearing gap 138 centers the fiber 22 within the fiber aperture 134, as explained above. Centering of the fiber 22 through the curved fiber aperture 134 creates a curve to the fiber 22 which changes the direction of the fiber 22 without physical contact. Accordingly, use of a bent or otherwise curved fiber aperture 134 allows the fiber 22 to be turned or reoriented.

It will be understood that a variety of advantages may be derived from use of this disclosure. For example, a much higher heat transfer rate between the fiber 22 and the fiber thermal control device 50 may be realized as compared to conventional heating and cooling systems of the fiber 22. This higher heat transfer rate may be desirable to produce a higher degree of radial variation in stress (thermal tempering) that may decrease optical transmission loss through the fiber 22. Additionally, using the disclosure above, lower flow rates of gas through the fiber thermal control device 50 may be used to achieve the same level of heat transfer. The lower flow rate of gas permits expensive process gasses (e.g., helium) to be used because less of the expensive gas may be lost to the atmosphere. Further, the fiber thermal control device 50 is capable of being used on both linear sections of the fiber 22, as well as curved sections of the fiber 22. Even further, the energy transfer functions of the fiber thermal control device 50 may be used independently from the fiber turning features thereby allowing greater process flexibility.

It will be apparent to those skilled in the art that various modifications and variations can be made without departing from the spirit or scope of the claims.

What is claimed is:

1. A method of controlling a temperature of an optical fiber comprising the steps:
   providing an energy transfer member configured to accept or provide thermal energy, the energy transfer member defining an energy transfer surface;

passing an optical fiber proximate the energy transfer member such that a gap is defined between the optical fiber and the energy transfer surface;

heating the energy transfer member with one or more heaters; and transferring thermal energy between the optical fiber and the energy transfer member via conduction across the gap, wherein heat generated by the one or more heaters is transferred from the energy transfer member to the optical fiber via conduction across the gap to thereby heat the optical fiber, wherein the conduction of thermal energy transferred across the gap by conduction is greater than about 2% of thermal energy transferred between the optical fiber and the energy transfer member.

2. The method of claim 1, wherein a majority of the thermal energy transferred between the optical fiber and the energy transfer member is transferred through conduction.

3. The method of claim 1, wherein conduction of thermal energy transferred across the gap by conduction is greater than about 5% of thermal energy transferred between the optical fiber and the energy transfer member.

4. The method of claim 3, wherein conduction of thermal energy transferred across the gap by conduction is greater than about 25% of thermal energy transferred between the optical fiber and the energy transfer member.

5. The method of claim 1, wherein the thermal energy is transferred via conduction through a gas disposed within the gap.

6. A method of controlling the temperature of an elongate member comprising the steps:

providing an energy transfer member defining an energy transfer surface;

passing an elongate member proximate the energy transfer member such that a bearing gap is defined between the elongate member and the energy transfer surface;

passing a gas through the energy transfer member into the bearing gap;

heating the energy transfer member with one or more heaters; and transferring thermal energy between the elongate member and the energy transfer member via conduction across the gap, wherein heat generated by the one or more heaters is transferred from the energy transfer member to the elongate member via conduction across the bearing gap to thereby heat the elongate member, wherein conduction of thermal energy across the gap is greater than about 2% of thermal energy between the elongate member and the energy heat transfer member.

7. The method of claim 6, wherein a majority of the thermal energy transferred between the elongate member and the energy transfer member is transferred through conduction.

8. The method claim 6, wherein conduction of thermal energy across the bearing gap is greater than about 5% of thermal energy between the elongate member and the energy heat transfer member.

9. A method of controlling the temperature of an elongate member comprising the steps:

providing an energy transfer member defining an energy transfer surface;

passing an elongate member proximate the energy transfer member such that a bearing gap is defined between the elongate member and the energy transfer surface;

passing a gas through the energy transfer member into the bearing gap;

heating the energy transfer member with one or more heaters; and transferring thermal energy between the elongate member and the energy transfer member via conduction across the bearing gap, wherein heat generated by the one or more heaters is transferred from the energy transfer member to the elongate member via conduction across the bearing gap to thereby heat the elongate member, wherein the energy transfer member is porous.

10. The method of claim 9, wherein the gas has a flow rate over the elongate member of less than about 0.02 kg/s/m.

* * * * *

UNITED STATES PATENT AND TRADEMARK OFFICE
CERTIFICATE OF CORRECTION

PATENT NO. : 10,611,669 B2
APPLICATION NO. : 15/405645
DATED : April 7, 2020
INVENTOR(S) : John Christopher Thomas et al.

It is certified that error appears in the above-identified patent and that said Letters Patent is hereby corrected as shown below:

In the Claims

In Column 12, Line 7, Claim 6, delete "the gap" and insert -- the bearing gap --, therefor.

In Column 12, Line 15 (approx.), Claim 8, delete "claim" and insert -- of claim --, therefor.

Signed and Sealed this
Ninth Day of January, 2024

Katherine Kelly Vidal
*Director of the United States Patent and Trademark Office*